(12) United States Patent
Kubota et al.

(10) Patent No.: US 6,734,151 B1
(45) Date of Patent: May 11, 2004

(54) PROCESS FOR PRODUCING A HIGH-PURITY OXYGENIC COMPOUND AND LUBRICATING OIL

(75) Inventors: Minoyuki Kubota, Chiba (JP); Kazuhiko Suzuki, Chiba (JP); Hirotaka Yamazaki, Chiba (JP); Tokuyuki Yoshimoto, Mie (JP); Akihisa Ogawa, Mie (JP); Shigeru Kamimori, Mie (JP)

(73) Assignees: Idemitsu Kosan Co., Ltd., Tokyo (JP); Kyowa Yuka Co., Ltd., Tokyo (JP)

(*) Notice: Subject to any disclaimer, the term of this patent is extended or adjusted under 35 U.S.C. 154(b) by 0 days.

(21) Appl. No.: 10/070,820

(22) PCT Filed: Sep. 8, 2000

(86) PCT No.: PCT/JP00/06153

§ 371 (c)(1), (2), (4) Date: Mar. 11, 2002

(87) PCT Pub. No.: WO01/19875

PCT Pub. Date: Mar. 22, 2001

(30) Foreign Application Priority Data

Sep. 10, 1999  (JP) ............................................ 11-257205

(51) Int. Cl.$^7$ ...................... C10M 107/22; C08F 16/12
(52) U.S. Cl. ..................... 508/579; 252/68; 526/332; 568/621
(58) Field of Search ........................... 252/68; 508/579; 568/621

(56) References Cited

U.S. PATENT DOCUMENTS

| | | | |
|---|---|---|---|
| 4,677,231 A | | 6/1987 | Aoshima et al. |
| 5,294,356 A | | 3/1994 | Tanaka et al. |
| 5,384,056 A | | 1/1995 | Tanaka et al. |
| 5,393,856 A | | 2/1995 | Kulzick et al. |
| 5,449,472 A | * | 9/1995 | Egawa et al. ................ 252/68 |
| 5,518,643 A | * | 5/1996 | Egawa et al. ................ 252/68 |
| 5,908,818 A | * | 6/1999 | Egawa et al. ................ 508/579 |
| RE36,914 E | | 10/2000 | Carlsen et al. |
| 6,306,803 B1 | * | 10/2001 | Tazaki ........................ 508/539 |
| 6,454,960 B1 | * | 9/2002 | Sunaga et al. ................ 252/67 |

FOREIGN PATENT DOCUMENTS

| | | |
|---|---|---|
| EP | 0 528 043 | 2/1993 |
| EP | 0 644 175 | 3/1995 |
| EP | 0 696 564 | 2/1996 |
| EP | 0 779 289 | 6/1997 |
| EP | 0 846 749 | 6/1998 |
| JP | 51-138279 | 11/1976 |
| JP | 4-197407 | 7/1992 |
| JP | 10-46169 | 2/1998 |
| JP | 10-147682 | 6/1998 |
| JP | 10-159734 | 6/1998 |

OTHER PUBLICATIONS

Patent Abstracts of Japan, JP 51–138279, Nov. 29, 1976.
Patent Abstracts of Japan, JP 10–46169, Feb. 17, 1998.
Patent Abstracts of Japan, JP 10–159734, Jun. 16, 1998 (submitting corr. EP 0 846 749 only).
Patent Abstracts of Japan, JP 10–147682, Jun. 2, 1998.
Patent Abstracts of Japan, JP 04–197407, Jul. 17, 1992.

* cited by examiner

Primary Examiner—Ellen M McAvoy
(74) Attorney, Agent, or Firm—Oblon, Spivak, McClelland, Maier & Neustadt, P.C.

(57) ABSTRACT

A process for efficiently producing a high purity compound having oxygen which has a high volume specific resistance and a lubricating oil comprising the high purity compound having oxygen are provided.

The process for producing a high purity compound having oxygen selected from a group consisting of high purity polyvinyl ether compounds, high purity polyalkylene glycol compounds, high purity polyol ester compounds, high purity cyclic polyether compounds and high purity carbonate compounds comprises a step of treating with an adsorbent at least one crude compound having oxygen selected from a group consisting of crude polyvinyl ether compounds, crude polyalkylene glycol compounds, crude polyol ester compounds, crude cyclic polyether compounds and crude carbonate compounds. The lubricating oil comprises the high purity compound having oxygen obtained in accordance with this process.

8 Claims, No Drawings

PROCESS FOR PRODUCING A HIGH-PURITY OXYGENIC COMPOUND AND LUBRICATING OIL

TECHNICAL FIELD

The present invention relates to a process for producing a high purity compound having oxygen such as a high purity polyvinyl ether compound and a lubricating oil comprising the high purity compound having oxygen obtained in accordance with this process. More particularly, the present invention relates to a process for efficiently producing a high purity compound having oxygen which has a high volume specific resistance and is advantageously used as a component of a lubricating oil for refrigerators by an adsorption treatment, and a lubricating oil, in particular, a lubricating oil for refrigerators which comprises the high purity compound having oxygen obtained in accordance with this process and has an improved volume specific resistance.

BACKGROUND ART

In general, compression-type refrigerators are constituted with a compressor, a condenser, an expansion valve and an evaporator and has a structure in which a mixed fluid of a refrigerant and a lubricating oil is circulated in a closed system. In the compression-type refrigerator, in general, temperature is as high as 50° C. or higher in the compressor and as low as about −40° C. in the refrigerating chamber although the conditions may be different depending on the type of the apparatus and it is required, in general, that the refrigerant and the lubricating oil be circulated in the system without causing a phase separation in the temperature range of −40 to 50° C. If the phase separation takes place during the operation of a refrigerator, the life and the efficiency of the apparatus are adversely affected to a great extent. For example, if the phase separation of the refrigerant and the lubricating oil takes place in the compressor, lubrication of moving parts deteriorates and seizure occurs to cause a great decrease in the life of the apparatus. If the phase separation takes places in the evaporator, the efficiency of heat exchange decreases because of the presence of a lubricating oil of high viscosity.

Since the lubricating oil for refrigerators is used for the purpose of lubricating moving parts in refrigerators, the lubricating property is naturally important. In particular, since the temperature in the compressor becomes high, the viscosity which can maintain the oil film necessary for the lubrication is important. The required viscosity is different depending on the type of the compressor used and working conditions and, in general, it is preferable that the viscosity (the kinematic viscosity) of the lubricating oil before mixing with a refrigerant is 5 to 1,000 $mm^2$/sec at 40° C. When the viscosity is lower than this range, the oil film becomes thin and the lubrication tends to become insufficient. When the viscosity is higher than this range, the efficiency of heat exchange decreases.

As the refrigerant for compression-type refrigerators, mainly dichlorodifluoromethane(fron 12) has heretofore been used. As the lubricating oil, various types of mineral oils and synthetic oils satisfying the required properties described above have been used. However, chlorofluorocarbons (CFC) including dichlorodifluoromethane are more rigorously restricted world-wide because there is the possibility of causing environmental pollution such as the ozonosphere destruction. Due to this reason, hydrofluorocarbons (HFC) and hydrochlorofluorocarbons (HCFC) which are fluorocarbons having hydrogen has been attracting attention as the novel types of refrigerant. The fluorocarbons having hydrogen, in particular, hydrofluorocarbons (HFC) such as fron 134a (1,1,1,2-tetrafluoroethane) as a typical example are preferable as the refrigerant for compression-type refrigerators since these hydrofluorocarbons have little possibility of causing the ozonosphere destruction and can be used in place of dichlorodifluoromethane with a little change in the structure of conventional refrigerators. Refrigerants prepared by mixing more than one HFC are also attracting attention from the standpoint of the efficiency of refrigeration. Other refrigerants having a small coefficient of atmospheric warming such as a carbon dioxide, hydrocarbons, ether and ammonia are also attracting attention from the standpoint of the global warming of the atmosphere.

When a fluorocarbon having hydrogen such as fron 134a or a carbon dioxide is used as the refrigerant for a compression-type refrigerator in place of fron 12, a lubricating oil having excellent compatibility with the fluorocarbons having hydrogen such as fron 134a or a carbon dioxide and excellent lubricating properties satisfying the above requirements are naturally required. However, since conventional lubricating oils used in combination with fron 12 do not have sufficient compatibility with fluorocarbons having hydrogen such as fron 134a or a carbon dioxide, a novel lubricating oil suitable for these compounds is required. In this case, no change in the structure of the apparatus is desired when the novel lubricating oil is used in place of fron 12. Therefore, it is not desirable that the structures of the currently used apparatuses must be changed to a great extent by replacing a lubricant.

As the lubricating oil for compression-type refrigerators using a hydrofluorocarbon as the refrigerant, for example, the use of a polyvinyl ether compound which is a compound having oxygen has been proposed (Japanese Patent Application Laid-Open Nos. Heisei 6(1994)-234815 and Heisei 9(1997)-272886).

In electric refrigerators and air conditioners, a motor and a compressor are integrally formed as a single member and an excellent electric insulating property is required for a lubricating oil used for them. However, it occasionally occurs that a compound having oxygen such as a polyvinyl ether compound is contaminated with polar substances or metal components during the process of production thereof and the volume specific resistance is decreased. As the method for increasing the decreased volume specific resistance, a treatment such as washing with an alkali or water is known. However, the effect of the washing is not always sufficient. Therefore, development of a novel treatment process for increasing the volume specific resistance of the compound having oxygen such as a polyvinyl ether compound has been desired.

DISCLOSURE OF THE INVENTION

Under the above circumstances, the present invention has an object of providing a process for efficiently producing a high purity compound having oxygen which has a high volume specific resistance and a lubricating oil, in particular, a lubricating oil for refrigerators which comprises the high purity compound having oxygen obtained in accordance with this process and has an improved volume specific resistance.

As the result of extensive studies by the present inventors to achieve the above object, it was found that a high purity compound having oxygen which has a great volume specific resistance could be obtained by treating the compound having oxygen with an adsorbent, and in particular that a high purity polyvinyl ether compound having a volume specific resistance of $10^{14}$ Ω·cm or greater at 30° C. could be obtained, by treating a crude polyvinyl ether compound having a specific constituting unit as the main component with an adsorbent, and that a lubricating oil comprising this compound and having an improved volume specific resistance could be advantageously used especially for refrigerators. The present invention has been completed based on this knowledge.

The present invention provides a process for producing a high purity compound having oxygen selected from a group consisting of high purity polyvinyl ether compounds, high purity polyalkylene glycol compounds, high purity polyol ester compounds, high purity cyclic polyether compounds and high purity carbonate compounds, comprising a step of treating with an adsorbent at least one crude compound having oxygen selected from a group consisting of crude polyvinyl ether compounds, crude polyalkylene glycol compounds, crude polyol ester compounds, crude cyclic polyether compounds and crude carbonate compounds.

The present invention also provides, as aspects thereof:

(1) A process for producing a high purity compound having oxygen which comprises a step of treating with an adsorbent a crude polyvinyl ether compound, for example, a crude polyvinyl ether compound comprising a compound having a constituting unit represented by general formula (I):

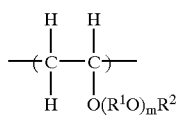

wherein $R^1$ represents a divalent hydrocarbon group having 1 to 10 carbon atoms which may be branched, $R^2$ represents a monovalent hydrocarbon group having 1 to 20 carbon atoms which may be branched, m represents numbers giving an average value in a range of 0 to 10, $R^1O$'s may represent the same group or different groups when more than one $R^1O$ are present, and $R^1$, $R^2$ and m may be the same with or different from each other among constituting units (the high purity compound having oxygen which is obtained in accordance with the present aspect of the process will be referred to as high purity compound having oxygen I, hereinafter.);

(2) A process for producing a high purity compound having oxygen which comprises a step of treating with an adsorbent a crude polyalkylene glycol compound, a crude polyol ester compound, a crude cyclic polyether compound or a crude carbonate compound (the high purity compound having oxygen which is obtained in accordance with the present aspect of the process will be referred to as high purity compound having oxygen II, hereinafter.);

(3) A lubricating oil comprising the high purity polyvinyl ether compound obtained in accordance with the process described in the above (1) (the lubricating oil of the present aspect will be referred to as lubricating oil I, hereinafter); and (4) A lubricating oil comprising at least one high purity compound having oxygen selected from a group consisting of high purity polyalkylene glycol compounds, high purity polyol ester compounds, high purity cyclic polyether compounds and high purity carbonate compounds which are obtained in accordance with the process described in the above (2) (the lubricating oil of the present aspect will be referred to as lubricating oil II, hereinafter).

THE MOST PREFERRED EMBODIMENT TO CARRY OUT THE INVENTION

In the process for producing high purity compound having oxygen I of the present invention, a crude polyvinyl ether compound is purified by the treatment with an adsorbent. It is preferable that the crude polyvinyl ether compound comprises a compound having a constituting unit represented by the following general formula (I):

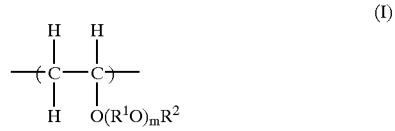

In the above general formula (I), $R^1$ represents a divalent hydrocarbon group having 1 to 10 carbon atoms which may be branched. Examples of the hydrocarbon group represented by $R^1$ include linear, branched and cyclic hydrocarbon groups. Specific examples of the hydrocarbon group represented by $R^1$ include a methylene group, an ethylene group, a trimethylene group, a methylethylene group, a tetramethylene group, a 1,1-dimethylethylene group, a 1,2-dimethylethylene group, a pentylene group, a hexylene group, a heptylene group, an octylene group, a nonylene group, a decylene group, a cyclopentylene group, a cyclohexylene group and a phenylene group. Among these groups, alkylene groups having 2 or 3 carbon atoms are preferable. In general formula (I), m represents number of repetition of the unit represented by $R^1O$. The average value of the numbers represented by m is in the range of 0 to 10 and preferably in the range of 0 to 5. When more than one $R^1O$ are present, $R^1O$'s may represent the same group or different groups.

$R^2$ represents a monovalent hydrocarbon group having 1 to 20 carbon atoms which may be branched. Examples of the hydrocarbon group represented by $R^2$ include linear, branched and cyclic hydrocarbon groups. Specific examples of the hydrocarbon group represented by $R^2$ include alkyl groups such as a methyl group, an ethyl group, a n-propyl group, an isopropyl group, a n-butyl group, an isobutyl group, a sec-butyl group, a tert-butyl group, various types of pentyl group, various types of hexyl group, various types of heptyl group, various types of octyl group, various types of decyl group and various types of dodecyl group; and cycloalkyl groups such as a cyclopentyl group, a cyclohexyl group, various types of methylcyclohexyl group, various types of ethylcyclohexyl group and various types of dimethylcyclohexyl group.

The groups represented by $R^1$, $R^2$ and m may be the same with or different from each other among constituting units. In other words, one or more types of constituting units represented by general formula (I) may be comprised.

The crude polyvinyl ether compound used in the present invention can be produced by homopolymerization or copolymerization of the corresponding vinyl ether monomers. In other words, the crude polyvinyl ether compound can be produced by polymerization of one or more types of vinyl ether monomer represented by general formula (II):

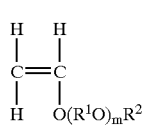

wherein $R^1$, $R^2$ and m are as defined above.

Examples of the vinyl ether monomer represented by general formula (II) include vinyl methyl ether, -vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, vinyl 2-methoxyethyl ether, vinyl 2-ethoxyethyl ether, vinyl 2-methoxy-1-methylethyl ether, vinyl 2-methoxy-2-methylethyl ether, vinyl 3,6-dioxaheptyl ether, vinyl 3,6,9-trioxadecyl ether, vinyl 1,4-dimethyl-3,6-dioxaheptyl ether, vinyl 1,4,7-trimethyl-3,6,9-trioxadecyl ether and vinyl 4-methoxyphenyl ether. These vinyl ether monomers can be produced in accordance with conventional processes.

The above vinyl ether monomers may be polymerized in accordance with a conventional process such as the radical polymerization, the cationic polymerization or the irradiation polymerization described in the first edition of "Gosei Kobunshi (Synthetic Polymers) III" edited by Shunsuke Murahasi, Minoru Imoto and Hisaya Tani, published by Asakura Shoten, Jun. 15, 1971. A polymer having a desired viscosity can be obtained when the vinyl ether monomer is polymerized in accordance with the process described in the following.

For the initiation of the polymerization, a combination of a Brønsted acid, a Lewis acid or an organometallic compound and an alcohol, water, a phenol, an acetal or an addition product of a vinyl ether and a carboxylic acid can be used. Examples of the Brønsted acid include hydrofluoric acid, hydrochloric acid, hydrobromic acid, hydroiodic acid, nitric acid, sulfuric acid, trichloroacetic acid and trifluoroacetic acid. Examples of the Lewis acid include boron trifluoride, aluminum trichloride, aluminum tribromide, tin tetrachloride, zinc dichloride and iron(III) chloride. Among the Lewis acids, boron trifluoride and complexes thereof are preferable. Examples of the organometallic compound include diethylaluminum chloride, ethylaluminum dichloride and diethylzinc. The amount of the Brønsted acid, the Lewis acid or the organometallic compound is not particularly limited. It is preferable that the Brønsted acid, the Lewis acid or the organometallic compound is used in an amount of 0.001 to 10% by weight based on the amount of the vinyl ether monomer.

As water, the alcohol, the phenol, the acetal or the addition product of a vinyl ether and a carboxylic acid which is used in combination with the Brønsted acid, the Lewis acid or the organometallic compound, any compound can be selected. The amount of the above compound is not particularly limited. It is preferable that the above compound is used in an amount of 0.01 to 50% by weight based on the amount of the vinyl ether monomer.

The end of the polymer at which the polymerization has been initiated has the following structure depending on the compound used. When water, the alcohol or the phenol is used, hydrogen is attached. When the acetal is used, a group formed by removing one alkoxyl group from the used acetal is attached. When the addition product of a vinyl ether and a carboxylic acid is used, a group formed by removing an alkylcarbonyloxyl group derived from the portion of the carboxylic acid from the addition product of a vinyl ether and a carboxylic acid is attached. The end of the polymer at which the polymerization has been terminated has the following structure depending on the compound used. When water, the alcohol, the phenol or the acetal is used, the end of the polymer has a structure of an acetal, an olefin or an aldehyde. When the addition product of a vinyl ether and a carboxylic acid is used, the end of the polymer has a structure of a carboxylic acid ester of a hemiacetal. An aldehyde is obtained by hydrolysis of the carboxylic acid ester of a hemiacetal in the presence of an acid.

The polymerization of the vinyl ether monomer represented by general formula (II) can be initiated, in general, at a temperature in the range of −80 to 150° C. and can be conducted preferably in the range of 0 to 100° C. although the temperature is different depending on the type of the materials and the initiator. The polymerization is completed in about 10 seconds to 10 hours after the initiation of the polymerization.

As for the adjustment of the molecular weight in the polymerization, a polymer having a lower molecular weight can be obtained by increasing the amount of the alcohol, water, the phenol, the acetal or the addition product of a vinyl ether and a carboxylic acid based on the amount of the vinyl ether monomer represented by general formula (II). A polymer having a lower molecular weight can also be obtained by increasing the amount of the Brønsted acid or the Lewis acid. Viscosity of the polymer can be adjusted by the adjustment of the molecular weight.

The polymerization can be conducted in the absence of solvents or in the presence of a solvent inert under the polymerization condition. The type of the solvent is not particularly limited. Examples of the solvent include hydrocarbon solvents such as hexane, benzene, toluene and isooctane; and ether solvents such as diethyl ether, 1,2-dimethoxyethane and tetrahydrofuran. The polymerization can be terminated by addition of an alkali.

Since, in general, unsaturated bonds and acetals and/or aldehydes are present in the product obtained by the polymerization, it is preferable that these structures are converted into saturated bonds and ethers in accordance with a conventional process. For example, a crude polyvinyl ether compound can be obtained by reacting the acetal and the like with hydrogen at 70 to 200° C. in the presence of nickel and an oxide of silicon, aluminum, magnesium, titanium or zirconium such as nickel diatomaceous earth in accordance with the process described in WO96/33154 or the like.

The crude polyvinyl ether compound obtained as described above has a weight-average molecular weight in the range of 150 to 3,000 and preferably in the range of 200 to 2,000.

The crude polyvinyl ether compound means a compound comprising the polyvinyl ether compound and impurities such as metal compounds and polar substances and has a volume specific resistance smaller than $10^{14}$ Ω·cm at 30° C.

In the present invention, the crude polyvinyl ether compound is treated with an adsorbent. As the adsorbent used for this treatment, for example, an oxide of at least one metal selected from aluminum, iron, titanium, silicon, tin and the like, a clay mineral, activated carbon, an ion exchange resin or the like is preferably used. Among these adsorbents, activated carbon, silica-alumina, activated clay, bentonite, zeolite and activated alumina are more preferable from the standpoint of the effect. The adsorbent may be used singly or in combination of two or more.

In the treatment with the adsorbent, the crude polyvinyl ether compound may be brought into contact with the adsorbent in an amount in the range of about 0.1 to 25% by weight and preferably in the range of 0.5 to 10% by weight based on the amount of the crude polyvinyl ether compound at a temperature, in general, in the range of 0 to 100° C. and preferably in the range of 10 to 70° C. For bringing the crude polyvinyl ether compound into contact with the adsorbent, the crude polyvinyl compound may be passed through a column packed with the adsorbent or a batch process may be used. If necessary, the treatment may be conducted in the presence of a solvent. As the solvent, a non-polar solvent is preferable. Examples of the non-polar solvent include hydrocarbons such as hexane, cyclohexane, heptane, octane, isononane, toluene and xylene. The amount of the solvent is not particularly limited. It is preferable that the solvent is used in an amount of 1 to 30 parts by weight per 1 part by weight of the crude polyvinyl ether compound.

The time of the adsorption treatment varies depending on the temperature of the treatment, the absence or the presence of the solvent, the type and the amount of the adsorbent and the like and cannot be generally decided. The time of the adsorption treatment is, in general, in the range of 10 minutes to 10 hours and preferably in the range of 30 minutes to 5 hours. If necessary, the adsorption treatment can be conducted under an atmosphere of an inert gas such as nitrogen, argon or helium.

Ad A high purity polyvinyl ether compound having a great volume specific resistance of $10^{14}$ Ω·cm or greater at 30° C., namely a high electric insulating property can be obtained by the above treatment with the adsorbent.

On the other hand, in the process for producing high purity compound having oxygen II of the present invention, a crude polyalkylene glycol compound, a crude polyol ester compound, a crude cyclic polyether compound or a crude carbonate compound is purified by the treatment with the adsorbent.

The crude polyalkylene glycol compound, the crude polyol ester compound, the crude cyclic polyether compound and the crude carbonate compound mean compounds comprising a polyalkylene glycol compound, a polyol ester compound, a cyclic polyether compound and a carbonate compound, respectively, and impurities such as metal compounds and polar substances and have volume specific resistances smaller than $10^{12}$ Ω·cm at 30° C.

A high purity polyalkylene glycol compound, a high purity polyol ester compound, a high purity cyclic polyether compound and a high purity carbonate compound which have volume specific resistances of $10^{12}$ Ω·cm or greater at 30° C. can be obtained by treating the crude polyalkylene glycol compound, the crude polyol ester compound, the crude cyclic polyether compound and the crude carbonate compound, respectively, with the adsorbent.

In the above process, the type of the adsorbent and the process for the treatment with the adsorbent are the same as those described for the process for producing high purity compound having oxygen I described above.

Lubricating oil I of the present invention comprises the high purity polyvinyl ether compound obtained by the treatment described above as the main component. Lubricating oil II of the present invention comprises at least one high purity compound having oxygen selected from the high purity polyalkylene glycol compounds, the high purity polyol ester compounds, the high purity cyclic polyether compounds and the high purity carbonate compounds obtained by the treatment described above as the main component. Lubricating oil I and lubricating oil II are, in particular, advantageous as the lubricating oil used for refrigerators.

Examples of the polyalkylene glycol compound include compounds represented by the following general formula:

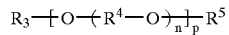

wherein $R^3$ represents an alcohol residue having 1 to 6 carbon atoms, $R^4$ represents an alkylene group having 2 to 4 carbon atoms, $R^5$ represents a hydrogen atom, an alkyl group having 1 to 10 carbon atoms or an acyl group, n represents a number of 1 to 80 and p represents a number of 1 to 6.

Examples of the polyol ester compound include esters of dihydric to tetrahydric alcohols such as neopentyl glycol, trimethylolpropane, trimethylolethane and pentaerythritol with linear and branched carboxylic acids having 2 to 18 carbon atoms.

Examples of the cyclic polyether compound include derivatives obtained by addition of alkylene oxides to polyhydric ether alcohols, which are represented by the following general formula:

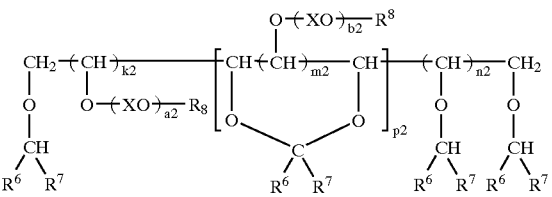

wherein $R^6$ represents a hydrogen atom or a linear or branched alkyl group having 1 to 21 carbon atoms, $R^7$ represents a branched alkyl group having 3 to 21 carbon atoms when $R^6$ represents a hydrogen atom and a linear or branched alkyl group having 1 to 21 carbon atoms when $R^6$ represents a linear or branched alkyl group having 1 to 21 carbon atoms, $R^6$ and $R^7$ may form an alkylene group having 2 to 13 carbon atoms in combination, $R^6$ and $R^7$ may be the same with or different from each other among constituting units, $R^8$ represents a. hydrogen atom or a linear or branched alkyl group having 1 to 8 carbon atoms, X represents a linear or branched alkylene group having 2 to 4 carbon atoms, $k_2$ represents a number of 0 to 4, $n_2$ represents a number of 0 to 3, $P_2$ represents a number of 0 to 2, $m_2$ represents 0 or 1, $k_2$, $m_2$, $P_2$ and $n_2$ satisfy the relation: $k_2+(m_2+2)p_2+n_2=4$, $a_2$ and $b_2$ each represent a number of 0 to 20, $a_2$, $b_2$, $k_2$, $m_2$ and $P_2$ satisfy the relation: $0<a_2k_2+b_2m_2p_2\leq20$, and units of a polyoxyalkyleneoxymethylene group in a number of $k_2$, units of an O alkyloxymethylene group in a number of $n_2$ and units of a cyclic acetal group (an acetal group or a ketal group) in a number of $P_2$ may have a random arrangement or a block arrangement;

And also, examples of the cyclic polyether compound include cyclic acetals represented by the following general formula:

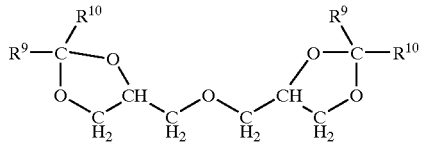

wherein $R^9$ represents a hydrogen atom, a methyl group or a linear or branched alkyl group having 2 to 21 carbon atoms and $R^{10}$ represents a linear or branched alkyl group having 3 to 21 carbon atoms when $R^9$ represents a hydrogen atom or a methyl group, and $R^{10}$ represents a linear or branched alkyl group having 2 to 21 carbon atoms when $R^9$ represents a linear or branched alkyl group having 2 to 21 carbon atoms; and cyclic acetals represented by the following general formula:

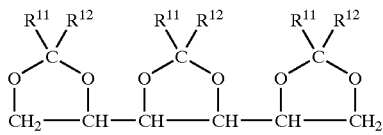

wherein $R^{11}$ and $R^{12}$ each represent a hydrogen atom or a linear or branched alkyl group having 1 to 21 carbon atoms excluding the case in which $R^{11}$ and $R^{12}$ both represent a hydrogen atom.

Examples of the carbonate compound include compounds represented by the following general formula:

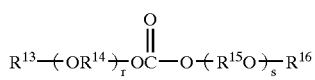

wherein $R^{13}$ and $R^{16}$ each represent a monovalent hydrocarbon group having 1 to 20 carbon atoms, $R^{14}$ and $R^{15}$ each represent an alkylene group having 1 to 10 carbon atoms and r and s each represent an integer of 1 to 100; and compounds having a constituting unit represented by the following general formula:

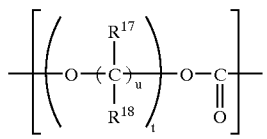

wherein $R^{17}$ and $R^{18}$ each represent a hydrogen atom, an alkyl group having 1 to 6 carbon atoms, an aryl group having 6 to 10 carbon atoms, an arylalkyl group having 7 to 10 carbon atoms or an alkoxyalkyl group having 2 to 6 carbon atoms, u represents an integer of 2 to 10 and t represents an integer of 1 to 100.

When high purity compound having oxygen I or high purity compound having oxygen II is used for a refrigerator, it is preferable that the kinematic viscosity of a lubricating oil before being mixed with a refrigerant is in the range of 5 to 1,000 mm²/second and more preferably in the range of 5 to 200 mm²/second at 40° C. When the polymer has a kinematic viscosity outside of the above range, the kinematic viscosity can be adjusted within the above range by mixing it with another polymer having a suitable kinematic viscosity.

As the refrigerant, hydrofluorocarbons (HFC) which have a small possibility of causing ozonosphere destruction are preferably used. Refrigerants obtained by running more than one HFC to improve the efficiency of refrigeration are preferable. From the standpoint of the global warming of the atmosphere, a carbon dioxide, hydrocarbons, ether and ammonia having a smaller coefficient of atmospheric warming can also be used advantageously.

In lubricating oil I of the present invention, the high purity polyvinyl ether compound described above can be used singly or in combination of two or more and can also be used in combination with other lubricating oils.

In lubricating oil II of the present invention, a single compound selected from the high purity polyalkylene glycol compounds, the high purity polyol ester compounds, the high purity cyclic polyether compounds and the high purity carbonate compounds described above may be used or a combination of two or more compounds suitably selected from the above compounds may be used. The above compounds can also be used in combination with other lubricating oils such as mineral oils, alkylbenzenes and poly-α-olefins.

To lubricating oil I and lubricating oil II of the present invention, various types of other additives used in the conventional lubricating oils such as load carrying additives, chlorine capturing agents, antioxidants, metal deactivators, defoaming agents, detergent-dispersants, viscosity-index improvers, oiliness agents, anti-wear additives, extreme pressure agents, antirust agents, corrosion inhibitors, pour point depressants may be added, if necessary.

The present invention will be described more specifically with reference to examples in the following. However, the present invention is not limited by the examples.

PREPARATION EXAMPLE OF CATALYST 1

Into a 2 liter autoclave made of SUS-316L, 12 g of a nickel diatomaceous earth catalyst (manufactured by NIKKI KAGAKU Co., Ltd.; the trade name: N113) and 300 g of isooctane were placed. After the autoclave was purged with nitrogen and then with hydrogen, the pressure of hydrogen was adjusted to 30 kg/cm²G and the temperature of the mixture was elevated. The mixture was kept at 140° C. for 30 minutes and then cooled to the room temperature. After the autoclave was purged with nitrogen, 20 g of acetaldehyde diethylacetal was added into the autoclave. After the autoclave was purged with nitrogen and then with hydrogen, the pressure of hydrogen was adjusted to 30 kg/cm²G and the temperature of the mixture was elevated. The mixture was kept at 130° C. for 30 minutes and then cooled to the room temperature. The pressure in the autoclave increased by the elevation of the temperature and a decrease in the pressure of hydrogen was also observed due to the reaction of acetaldehyde diethylacetal. When the pressure of hydrogen decreased to a pressure lower than 30 kg/cm²G, hydrogen was added and the pressure was kept at 30 kg/cm²G. After the mixture was cooled to the room temperature, the autoclave was depressurized and was purged with nitrogen.

Example 1

(1) Preparation of a Crude Polyvinyl Ether Compound

Into a 1 liter glass separable flask, 148.2 g of toluene, 27.38 g (5.94×10⁻¹ moles) of ethanol, 4.90 g (6.6×10⁻² moles) of isobutanol and 0.260 g of boron trifluoride diethyl etherate were placed. To the obtained mixture, a mixture of 465.83 g (6.460 moles) of ethyl vinyl ether and 71.89 g (7.18×10⁻¹ moles) of isobutyl vinyl ether was added over 5 hours. Since the reaction was exothermic, the flask was cooled in an ice water bath and the temperature of the reaction liquid was kept at 25° C.

Then, the reaction liquid was transferred to a 2 liter washing tank and washed twice with 200 ml of a 3% by weight aqueous solution of sodium hydroxide and three times with 200 ml of distilled water. The solvent and light fractions were removed from the washed reaction liquid under a reduced pressure using a rotary evaporator and 550.0 g of a crude product was obtained.

An autoclave containing a catalyst prepared in accordance with the same procedures as those described in Preparation Example of Catalyst 1 was opened and a liquid layer in the autoclave was removed by decantation. Into the autoclave, 400 g of the crude product obtained above was placed. After the autoclave was purged with nitrogen and then with hydrogen, the pressure of hydrogen was adjusted to 30 kg/cm²G and the temperature of the mixture was elevated. The mixture was kept at 140° C. for 2 hours and then cooled to the room temperature. The pressure in the autoclave increased by the elevation of the temperature and a decrease in the pressure of hydrogen was also observed due to the progress of the reaction. When the pressure of hydrogen decreased, hydrogen was suitably added and the pressure in the autoclave was kept at 30 kg/cm²G.

After the autoclave was purged with nitrogen, it was depressurized and the reaction liquid was recovered. To the recovered mixture, 100 g of isooctane was added and the catalyst was removed from the resultant mixture by filtration. The solvent and light fractions were removed from the obtained filtrate by treating under a reduced pressure using a rotary evaporator. The yield of a crude polyvinyl ether compound was 362 g.

The crude polyvinyl ether compound thus obtained had constituting units expressed by the following formulae (I-a) and (I-b) in amounts such that the ratio by mole (I-a)/(I-b) was 9/1, a kinematic viscosity of 68.86 mm²/second at 40° C., a kinematic viscosity of 8.26 mm²/second at 100° C. and a volume specific resistance of $3.26 \times 10^{13}$ Ω·cm at 30° C.

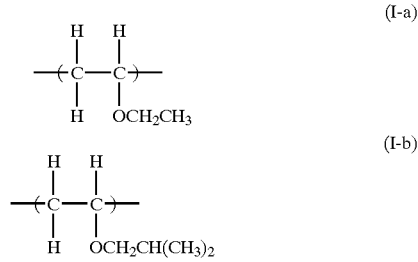

The results of the NMR analysis and the IR analysis showed that one polymer end had structure (A) or structure (D) and the other polymer end had either one of structure (B) and structure (E) as the major structures or structure (C) as a minor structure in an amount of 5% by weight or less.

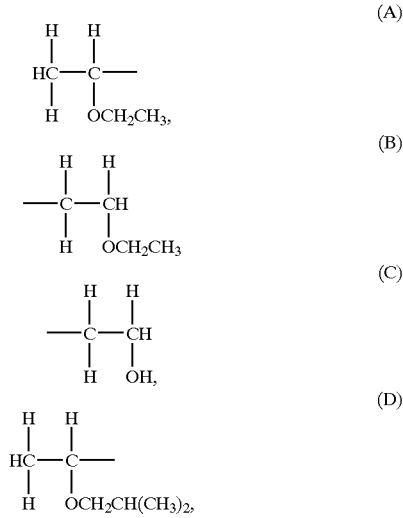

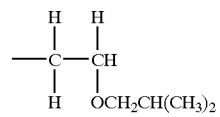

(2) Purification of the Crude Polyvinyl Ether Compound

The crude polyvinyl ether compound obtained in (1) described above in an amount of 150 g was dissolved into 300 g of isononane and the resultant solution was heated to 50° C. To the solution, 4.5 g of silica-alumina HA (manufactured by SHOKUBAI KASEI KOGYO Co., Ltd.) was added while the solution was stirred and the obtained mixture was heated at 50° C. under stirring for 1 hour under an atmosphere of nitrogen.

The silica-alumina was removed by filtration using a membrane filter and the solvent was removed from the resultant mother liquor using a rotary evaporator.

The purified polyvinyl ether compound obtained as described above had a volume specific resistance of $1.87 \times 10^{15}$ Ω·cm at 30° C.

The volume specific resistance was measured in accordance with the following method.

<Measurement of the Volume Specific Resistance>

After a sample was dried at 100° C. for 1 hour under a reduced pressure (0.3 to 0.8 mmHg), the sample was placed into a liquid cell for the measurement of the volume specific resistance placed in a thermostatted tank kept at 30° C. and sealed. After the sample was kept in the thermostatted tank kept at 30° C. for 40 minutes, the volume specific resistance was measured by a high ultra insulation meter R8340 manufactured by ADVANTEST Co., Ltd. at an applied voltage of 250 V.

EXAMPLE 2

A crude polyvinyl ether compound having constituting units expressed by formulae (I-a) and (I-b) in amounts such that the ratio by mole (I-a)/(I-b) was 9/1 and a volume specific resistance of $1.30 \times 10^{13}$ Ω·cm at 30° C. which was prepared in accordance with the same procedures as those conducted in Example 1 (1) in an amount of 150 g was dissolved into 300 g of isononane. To the resultant solution, 4.5 g of silica-alumina HA (manufactured by SHOKUBAI KASEI KOGYO Co., Ltd.) was added while the solution was stirred and the obtained mixture was stirred at 15° C. for 1 hour under an atmosphere of nitrogen.

The silica-alumina was removed by filtration using a membrane filter and the solvent was removed from the resultant mother liquor using a rotary evaporator.

The purified polyvinyl ether compound obtained as described above had a volume specific resistance of $8.33 \times 10^{14}$ Ω·cm at 30° C.

EXAMPLE 3

The same procedures as those conducted in Example 1 were conducted except that hexane was used in place of isononane. The results are shown in Table 1.

EXAMPLE 4

The same procedures as those conducted in Example 1 were conducted except that toluene was used in place of isononane. The results are shown in Table 1.

EXAMPLE 5

A crude polyvinyl ether compound having constituting units expressed by formulae (I-a) and (I-b) in amounts such that the ratio by mole (I-a)/(I-b) was 9/1 and a volume specific resistance of $1.10 \times 10^{12}$ Ω·cm at 30° C. which was prepared in accordance with the same procedures as those conducted in Example 1 (1) in an amount of 150 g was dissolved into 150 g of toluene. To the resultant solution, 1.5 g of silica-alumina HA (manufactured by SHOKUBAI KASEI KOGYO Co., Ltd.) was added while the solution was stirred and the obtained mixture was stirred at 15° C. for 1 hour under an atmosphere of nitrogen.

The silica-alumina was removed by filtration using a membrane filter and the solvent was removed from the resultant mother liquor using a rotary evaporator.

The purified polyvinyl ether compound obtained as described above had a volume specific resistance of $1.57 \times 10^{14}$ Ω·cm at 30° C.

EXAMPLE 6

A crude polyvinyl ether compound having constituting units expressed by formulae (I-a) and (I-b) in amounts such that the ratio by mole (I-a)/(I-b) was 9/1 and a volume specific resistance of $1.65 \times 10^{12}$ Ω·cm at 30° C. which was prepared in accordance with the same procedures as those conducted in Example 1 (1) in an amount of 150 g was heated to 50° C. in the absence of solvents. To the heated compound, 4.5 g of silica-alumina HA (manufactured by SHOKUBAI KASEI KOGYO Co., Ltd.) was added while the compound was stirred and the obtained mixture was heated at 50° C. under stirring for 1 hour under an atmosphere of nitrogen.

The silica-alumina was removed by filtration using a membrane filter.

The purified polyvinyl ether compound obtained as described above had a volume specific resistance of $3.33 \times 10^{14}$ Ω·cm at 30° C.

EXAMPLE 7 to 12

The same procedures as those conducted in Example 1 were conducted except that adsorbents shown-in Table 1—1 were used in place of silica-alumina HA. The results are shown in Table 1–2.

EXAMPLE 13

(1) Preparation of a Crude Polyvinyl Ether Compound

Into a 1 liter glass separable flask, 125 g of isooctane, 59.42 g ($8.02 \times 10^{-1}$ moles) of isobutanol and 0.316 g of boron trifluoride dietheyl etherate were placed. To the obtained mixture, a mixture of 438.58 g (6.082 moles) of ethyl vinyl ether and 71.99 g ($7.19 \times 10^{-1}$ moles) of isobutyl vinyl ether was added over 5 hours. Since the reaction was exothermic, the flask was cooled in an ice water bath and the temperature of the reaction liquid was kept at 45° C.

Then, the reaction liquid was transferred to a 2 liter washing tank and washed twice with 200 ml of a 3% by weight aqueous solution of sodium hydroxide and three times with 200 ml of distilled water. The solvent and light fractions were removed from the washed reaction liquid under a reduced pressure using a rotary evaporator and 534.1 g of a crude product was obtained.

An autoclave containing a catalyst prepared in accordance with the same procedures as those described in Preparation Example of Catalyst 1 was opened and a liquid layer in the autoclave was removed by decantation. Into the autoclave, 400 g of the crude product obtained above was placed. After the autoclave was purged with nitrogen and then with hydrogen, the pressure of hydrogen was adjusted at 30 kg/cm²G and the temperature of the mixture was elevated. The mixture was kept at 140° C. for 2 hours and then cooled to the room temperature. The pressure in the autoclave increased by the elevation of the temperature and a decrease in the pressure of hydrogen was also observed due to the progress of the reaction. When the pressure of hydrogen decreased, hydrogen was suitably added and the pressure in the autoclave was kept at 30 kg/cm²G.

After the autoclave was purged with nitrogen, it was depressurized and the reaction liquid was recovered. To the recovered reaction liquid, 100 g of isooctane was added and the catalyst was removed from the resultant mixture by filtration. The solvent and light fractions were removed from the obtained filtrate by treating under a reduced pressure using a rotary evaporator. The yield of a crude polyvinyl ether compound was 359 g.

The crude polyvinyl ether compound thus obtained had constituting units expressed by formulae (I-a) and (I-b) in amounts such that the ratio by mole (I-a)/(I-b) was 8/2, a kinematic viscosity of 32.54 mm²/second at 40° C., a kinematic viscosity of 5.14 mm²/second at 100° C. and a volume specific resistance of $1.32 \times 10^{13}$ Ω·cm at 30° C.

The results of the NMR analysis and the IR analysis showed that one polymer end had structure (A) or structure (D) and the other polymer end had either one of structure (B) and structure (E) as the major structures or structure (C) as a minor structure in an amount of 5% by weight or less.

(2) Purification of the Crude Polyvinyl Ether Compound

The crude polyvinyl ether compound obtained in (1) described above was purified in accordance with the same procedures as those conducted in Example 1 (2).

The purified polyvinyl ether compound obtained as described above had a volume specific resistance of $1.28 \times 10^{14}$ Ω·cm at 30° C.

EXAMPLE 14

(1) Preparation of a Crude Polyvinyl Ether Compound

Into a 1 liter glass separable flask, 125 g of toluene, 60.65 g ($8.18 \times 10^{-1}$ moles) of isobutanol and 0.322 g of boron trifluoride diethyl etherate were placed. To the obtained mixture, a mixture of 370.66 g (5.140 moles) of ethyl vinyl ether and 138.70 g (1.385 moles) of isobutyl vinyl ether was added over 5 hours. Since the reaction was exothermic, the flask was cooled in an ice water bath and the temperature of the reaction liquid was kept at 45° C.

Then, the reaction liquid was transferred to a 2 liter washing tank and washed twice with 200 ml of a 3% by weight aqueous solution of sodium hydroxide and three times with 200 ml of distilled water. The solvent and light fractions were removed from the washed reaction liquid under a reduced pressure using a rotary evaporator and 528.4 g of a crude product was obtained.

An autoclave containing a catalyst prepared in accordance with the same procedures as those described in Preparation Example of Catalyst 1 was opened and a liquid layer in the autoclave was removed by decantation. Into the autoclave, 400 g of the crude product obtained above was placed. After the autoclave was purged with nitrogen and then with hydrogen, the pressure of hydrogen was adjusted at 30 kg/cm²G and the temperature of the mixture was elevated. The mixture was kept at 140° C. for 2 hours and then cooled to the room temperature. The pressure in the autoclave increased by the elevation of the temperature and a decrease in the pressure of hydrogen was also observed due to the progress of the reaction. When the pressure of hydrogen decreased, hydrogen was suitably added and the pressure in the autoclave was kept at 30 kg/cm²G.

After the autoclave was purged with nitrogen, it was depressurized and the reaction liquid was recovered and 100 g of isooctane was added to the recovered reaction liquid. The catalyst was removed from the reaction liquid by filtration. The obtained filtrate was treated under a reduced pressure using a rotary evaporator and the solvent and light fractions were removed. The yield of a crude polyvinyl ether compound was 358 g.

The crude polyvinyl ether compound thus obtained had constituting units expressed by formulae (I-a) and (I-b) in amounts such that the ratio by mole (I-a)/(I-b) was 7/3, a kinematic viscosity of 29.65 mm$^2$/second at 40° C., a kinematic viscosity of 4.77 mm$^2$/second at 100° C. and a volume specific resistance of $5.60 \times 10^{14}$ Ω·cm at 30° C.

The results of the NMR analysis and the IR analysis showed that one polymer end had structure (A) or structure (D) and the other polymer end had either one of structure (B) and structure (E) as the major structures or structure (C) as a minor structure in an amount of 5% by weight or less.

(2) Purification of the Crude Polyvinyl Ether Compound

The crude polyvinyl ether compound obtained in (1) described above was purified in accordance with the same procedures as those conducted in Example 1 (2).

The purified polyvinyl ether compound obtained as described above had a volume specific resistance of $2.46 \times 10^{15}$ Ω·cm at 30° C.

EXAMPLE 15

(1) Preparation of a Crude Polyvinyl Ether Compound

Into a 1,000 ml glass flask equipped with a dropping funnel, a condenser and a stirrer, 200 g of toluene, 42.6 g of acetaldehyde dimethoxyethyl acetal and 0.90 g of boron trifluoride diethyl etherate were placed. Into the dropping funnel, 224 g of methoxyethyl vinyl ether was placed and it was added dropwise into the flask over 50 minutes. Since the reaction was exothermic, the flask was cooled in an ice water bath and the temperature of the reaction liquid was kept at about 25° C. After the addition was completed, the resultant mixture was stirred for 5 minutes. The reaction mixture was transferred to a washing tank and 400 ml of chloroform was added. The resultant mixture was washed three times with 200 ml of a 5% by weight aqueous solution of sodium hydroxide and three times with 300 ml of water. The solvent and unreacted materials were removed from the washed mixture under a reduced pressure using a rotary evaporator and 258 g of a crude product was obtained. The obtained crude product had a kinematic viscosity of 33.3 mm$^2$/second at 40° C.

Into a 2 liter autoclave made of SUS-316L, 220 g of the crude product, 600 g of hexane, 11.0 g of Raney nickel and 11.0 g of zeolite were placed. Hydrogen was introduced into the autoclave and the pressure of hydrogen was adjusted to 20 kg/cm$^2$. After the content in the autoclave was stirred for about 30 seconds, the autoclave was depressurized. Hydrogen was introduced into the autoclave again and the pressure of hydrogen was adjusted to 20 kg/cm$^2$. After the content in the autoclave was stirred for about 30 seconds, the autoclave was depressurized. After this procedure was repeated once again, the temperature was raised to 130° C. over 30 minutes while the pressure of hydrogen was kept at 50 kg/cm$^2$ and the reaction was allowed to proceed at 130° C. for 2 hours. During and after the elevation of the temperature, the reaction proceeded and a decrease in the pressure of hydrogen was observed. The reaction was allowed to proceed while the pressure of hydrogen was kept at 60 kg/cm$^2$ by suitably compensating the increase in the pressure due to the elevation of the temperature and the decrease in the pressure due to the reaction. After the reaction was completed, the mixture was cooled to the room temperature and the pressure was lowered to the ordinary pressure. The catalyst was precipitated by leaving the reaction mixture standing for 1 hour and the reaction liquid was separated by decantation. The catalyst was washed twice with 60 ml of hexane and the liquid obtained by washing was combined with the reaction liquid. The combined liquid was filtered with a filter paper. Hexane was removed from the liquid using a rotary evaporator under a reduced pressure. After 400 ml of chloroform was added to the obtained product, the resultant mixture was transferred to a washing tank and washed three times with 200 ml of a 5% by weight aqueous solution of sodium hydroxide and five times with 300 ml of distilled water. The solvent, water and the like were removed from the washed liquid under a reduced pressure using a rotary evaporator. The yield of a crude polyvinyl ether compound was 188 g.

The obtained crude polyvinyl ether compound had a constituting unit expressed by the following formula (I-c):

a kinematic viscosity of 30.4 mm$^2$/second at 40° C., a kinematic viscosity of 6.29 mm$^2$/second at 100° C. and a volume specific resistance of $2.50 \times 10^{12}$ Ω·cm at 30° C.

(2) Purification of the Crude Polyvinyl Ether Compound

The crude polyvinyl ether compound obtained in (1) described above was purified in accordance with the same procedures as those conducted in Example 1 (2).

The purified polyvinyl ether compound obtained as described above had a volume specific resistance of $1.50 \times 10^{14}$ Ω·cm at 30° C.

The results of Examples 1 to 15 are shown together in Table 1.

TABLE 1-1

|  | Polyvinyl ether compound | | |
|  | constituting units | ratio of amounts by mole | Adsorbent |
| --- | --- | --- | --- |
| Example 1 | (I-a)/(I-b) | 9/1 | silica-alumina HA |
| Example 2 | (I-a)/(I-b) | 9/1 | silica-alumina HA |
| Example 3 | (I-a)/(I-b) | 9/1 | silica-alumina HA |
| Example 4 | (I-a)/(I-b) | 9/1 | silica-alumina HA |
| Example 5 | (I-a)/(I-b) | 9/1 | silica-alumina HA |
| Example 6 | (I-a)/(I-b) | 9/1 | silica-alumina HA |
| Example 7 | (I-a)/(I-b) | 9/1 | silica-alumina LA |
| Example 8 | (I-a)/(I-b) | 9/1 | activated clay |
| Example 9 | (I-a)/(I-b) | 9/1 | Ca-type bentonite |
| Example 10 | (I-a)/(I-b) | 9/1 | activated carbon A |
| Example 11 | (I-a)/(I-b) | 9/1 | activated carbon B |
| Example 12 | (I-a)/(I-b) | 9/1 | activated carbon C |
| Example 13 | (I-a)/(I-b) | 8/2 | silica-alumina HA |
| Example 14 | (I-a)/(I-b) | 7/3 | silica-alumina HA |
| Example 15 | (I-c) | — | silica-alumina HA |

Notes:
Silica-alumina HA, LA: manufactured by SHOKUBAI KASEI KOGYO Co., Ltd.
Activated clay: manufactured by MIZUSAWA KAGAKU KOGYO Co., Ltd.; "GAREON EARTH NS"
Ca-type bentonite: manufactured by KUNIMINE KOGYO Co., Ltd.; "KB"
Activated carbon A: manufactured by NIPPON NORIT; "CA1"
Activated carbon B: manufactured by NIPPON NORIT; "SA Plus"
Activated carbon C: manufactured by NIPPON NORIT; "S-51"
The amount of the adsorbent: 1% by weight in Example 5 and 3% by weight in other Examples, based on the amount of the polyvinyl ether compound
The amount of the solvent: 1 part by weight in Example 5 and 2 parts by weight in other Examples per 1 part by weight of the polyvinyl ether compound

TABLE 1-2

| | Conditions of adsorption | | Volume specific resistance at 30° C. (Ω·cm) | |
|---|---|---|---|---|
| | solvent | temperature (° C.) | before adsorption | after adsorption |
| Example 1 | isononane | 50 | $3.26 \times 10^{13}$ | $1.87 \times 10^{15}$ |
| Example 2 | isononane | 15 | $1.30 \times 10^{13}$ | $8.33 \times 10^{14}$ |
| Example 3 | hexane | 50 | $3.26 \times 10^{13}$ | $5.83 \times 10^{14}$ |
| Example 4 | toluene | 50 | $3.26 \times 10^{13}$ | $4.48 \times 10^{14}$ |
| Example 5 | toluene | 15 | $1.10 \times 10^{12}$ | $1.57 \times 10^{14}$ |
| Example 6 | none | 50 | $1.65 \times 10^{12}$ | $3.33 \times 10^{14}$ |
| Example 7 | isononane | 50 | $3.26 \times 10^{13}$ | $3.15 \times 10^{14}$ |
| Example 8 | isononane | 50 | $3.26 \times 10^{13}$ | $2.46 \times 10^{14}$ |
| Example 9 | isononane | 50 | $3.26 \times 10^{13}$ | $3.56 \times 10^{14}$ |
| Example 10 | isononane | 50 | $3.26 \times 10^{13}$ | $2.40 \times 10^{14}$ |
| Example 11 | isononane | 50 | $3.26 \times 10^{13}$ | $5.22 \times 10^{14}$ |
| Example 12 | isononane | 50 | $3.26 \times 10^{13}$ | $5.60 \times 10^{14}$ |
| Example 13 | isononane | 50 | $1.32 \times 10^{13}$ | $1.28 \times 10^{14}$ |
| Example 14 | isononane | 50 | $5.60 \times 10^{14}$ | $2.46 \times 10^{15}$ |
| Example 15 | isononane | 50 | $2.50 \times 10^{12}$ | $1.50 \times 10^{14}$ |

Comparative Example 1

A crude polyvinyl ether compound having constituting units expressed by formulae (I-a) and (I-b) in amounts such that the ratio by mole (I-a)/(I-b) was 9/1 and a volume specific resistance of $1.65 \times 10^{12}$ Ω·cm at 30° C. which was prepared in accordance with the same procedures as those conducted in Example 1 (1) in an amount of 150 g was dissolved into 300 g of hexane. To the resultant solution, 150 g of a 3% by weight aqueous solution of sodium hydroxide was added. After the obtained mixture was vigorously stirred, the hexane layer was separated in a separation funnel. The separated hexane layer was washed three times with 100 g of pure water and then the solvent was removed using a rotary evaporator.

The polyvinyl ether compound treated as described above had a volume specific resistance of $1.80 \times 10^{12}$ Ω·cm at 30° C.

EXAMPLE 16

Purification of Polypropylene Glycol

A commercial crude polypropylene glycol (the weight-average molecular weight: 950; the kinematic viscosity at 40° C.: 38.45 mm²/second; the kinematic viscosity at 100° C.: 9.15 mm²/second) had a volume specific resistance of $4.05 \times 10^{10}$ Ω·cm at 30° C.

The above crude polypropylene glycol in an amount of 150 g was dissolved into 300 g of isononane. Into the resultant solution, 4.5 g of silica-alumina HA (manufactured by SHOKUBAI KASEI KOGYO Co., Ltd.) was added while the solution was stirred and the obtained mixture was stirred at the room temperature for 1 hour under an atmosphere of nitrogen.

The silica-alumina was removed by filtration using a membrane filter and the solvent was removed using a rotary evaporator. The purified polypropylene glycol obtained as described above had a volume specific resistance of $2.15 \times 10^{12}$ Ω·cm at 30° C.

Industrial Applicability

In accordance with the present invention, the high purity compound having oxygen such as the high purity polyvinyl ether compound which can be advantageously used as a component for lubricating oils, in particular, lubricating oils for refrigerators can be efficiently produced by the adsorption treatment.

The lubricating oil comprising the high purity compound having oxygen as the main component which is obtained in accordance with the above process can be advantageously used especially as a lubricating oil for compression-type refrigerators using a hydrofluorocarbon as the refrigerant.

What is claimed is:

1. A process for producing e high purity polyvinyl ether compounds having a constituting unit represented by general formula (I):

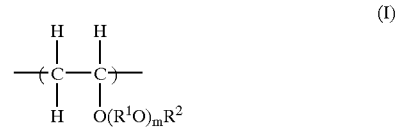

wherein $R^1$ represents a divalent hydrocarbon group having 1 to 10 carbon atoms which may be branched, $R^2$ represents a monovalent hydrocarbon group having 1 to 20 carbon atoms which may be branched, m represents numbers giving an average value in a range of 0 to 10, $R^1O$'s may represent the same group or different groups when more than one $R^1O$ are present, and $R^1$, $R^2$ and m may be the same with or different from each other among constituting units, comprising a step of treating at least one crude polyvinyl ether compound of said general formula (I) with an adsorbent, wherein said adsorbent is silica-alumina, activated clay, bentonite or activated carbon.

2. A lubricating oil which comprises a high purity polyvinyl ether compound obtained in accordance with the process described in claim 1.

3. A lubricating oil which comprises a high purity polyvinyl ether compound which is obtained in accordance with the process described in claim 1 and has a volume specific resistance of $10^{14}$ Ω·cm or greater at 30° C.

4. The lubricating oil according to claim 2 which is used for refrigerators.

5. The process according to claim 1, wherein the step of treating at least one crude polyvinyl ether compound with an adsorbent is a step of bringing the at least one crude polyvinyl ether compound into contact with the adsorbent.

6. The process according to claim 1, wherein the crude polyvinyl ether compound has a volume specific resistance smaller than $10^{14}$ Ω·cm at 30° C. and the high purity polyvinyl ether compound obtained after the treatment with a adsorbent has a volume specific resistance of $10^{14}$ Ω·cm or greater at 30° C.

7. The process according to claim 1, wherein the crude polyvinyl ether compound has a weight-average molecular weight in a range of 150 to 3,000.

8. The lubricating oil according to claim 3 which is used for refrigerators.

* * * * *